United States Patent [19]

Pinson

[11] Patent Number: 5,313,374
[45] Date of Patent: May 17, 1994

[54] MOUNTING DEVICE FOR A PART OF A MOTOR VEHICLE HEADLAMP

[75] Inventor: Ghislaine Pinson, Villeneuve la Garenne, France

[73] Assignee: Valeo Vision, Bobigny Cedex, France

[21] Appl. No.: 43,266

[22] Filed: Apr. 6, 1993

[30] Foreign Application Priority Data

Apr. 6, 1992 [FR] France .................. 92 04164

[51] Int. Cl.⁵ ............................................. B60Q 1/04
[52] U.S. Cl. ..................................... 362/61; 362/396; 362/421
[58] Field of Search ................ 362/61, 66, 421, 396

[56] References Cited

U.S. PATENT DOCUMENTS

| 4,689,725 | 8/1987 | Saijo et al. | 362/66 |
| 4,894,754 | 1/1990 | Levilain | 362/66 |
| 4,974,123 | 11/1990 | Luallin et al. | 362/66 |

FOREIGN PATENT DOCUMENTS 2351350 12/1977 France .
2463311 2/1981 France .
2543894 10/1984 France .

Primary Examiner—Stephen F. Husar
Attorney, Agent, or Firm—Morgan & Finnegan

[57] ABSTRACT

A motor vehicle lighting or indicating unit comprises a first part, such as a reflector, and a second part such as a headlamp casing. The first part is mounted to the second part by a mounting device comprising at least one bar carried by one of the two parts of the unit and having a substantially spherical head, together with at least one retaining means which is mounted on the other part of the unit and which has a recess substantially complementary to the head. This recess is open transversely so as to receive the head, while the retaining means is arrange to pivot about an axis passing substantially through the center of the recess, between a position in which the head can be fitted into the corresponding recess and another position in which it is retained in the latter. The arrangement is especially applicable to a three point mounting of a headlamp reflector on the casing of the headlamp.

11 Claims, 3 Drawing Sheets

MOUNTING DEVICE FOR A PART OF A MOTOR VEHICLE HEADLAMP

FIELD OF THE INVENTION

The present invention is concerned in general terms with the mechanical assembly of components. It is especially concerned with a novel mounting device which finds particular use in the mounting of a reflector of a motor vehicle headlamp on a casing of the same headlamp, or again, for example, a casing or backplate of a lighting or indicating unit on the bodywork of the vehicle.

The invention is directed to such mounting devices, to lighting or indicating units for motor vehicles including such mounting devices, and to methods of fitting the two parts of the unit together.

BACKGROUND OF THE INVENTION

At the present time it is known to provide a mounting or fastening device for securing a reflector of a headlamp on a casing of the latter, the mounting device being of a kind comprising a bar which is mounted on the headlamp casing and which has a spherical head at one end. This spherical head fits in a non-return recess which is arranged in the rear of the reflector. Such a mounting device is used in particular at each of the mounting points of a three point, or tripod, mounting assembly. Tripod mounting assemblies are well known and are used for assembling a reflector to a headlamp casing, so that both the line of sight and the azimuth of the reflector can be adjusted by longitudinal displacement of two of the three heads. A three point mounting assembly is of course one which defines three mounting points which are disposed respectively at the three apices of a right angled triangle.

One disadvantage of the kind of mounting assembly described above lies in the fact that it is necessary not only to obtain absolute precision in the relative positions of the heads when positioning the heads in surface contact with the recesses, but also to position them all at the same time, in order to ensure their correct engagement in the recesses. When a screw head is not aligned exactly with the corresponding recess, it is not possible to engage it in the recess without there being a danger of the components in which the recess is defined being bent or even broken. In this connection it is very difficult to bring the three screw heads into contact in the three corresponding non-return recesses arranged on a triangle, all at the same time. Thus it often happens that two of the screw heads out of three are engaged at the same time while the third head has to be engaged by bending, thus running the risk mentioned above.

DISCUSSION OF THE INVENTION

In order to overcome these drawbacks, the present invention proposes a mounting device for one part of a lighting or indicating unit for a motor vehicle, for example a reflector, on another part of the same unit such as a headlamp casing, the mounting device being of the type comprising at least one bar which is mounted on one of the two said parts and which includes an essentially spherical head, and at least one retaining means mounted on the other said part and having a recess which is substantially complementary to the head, the mounting device being characterised in that the recess is open transversely so as to receive the head, and in that the said retaining means is able to pivot about an axis passing essentially through the center of the said recess, between a position in which the head can be fitted in the said recess and another position in which the head is retained in the recess.

Thus by using the mounting device according to the invention, a reflector can easily be assembled with a headlamp casing, by introducing the spherical head of the bar (which is mounted for example on the casing) transversely into the recess of the retaining means through the transverse opening of the latter. The said retaining means then merely needs to be caused to pivot in such a way that the recess is put into a position in which it will retain the said head.

In one embodiment, the mounting device according to the invention includes a locking element which can be clipped on to the said retaining means in its retaining position, so as to close the transverse opening of the said recess containing the head.

Preferably in accordance with the invention, the locking means includes a connecting strap which terminates in a retaining loop which is slid on to the bar, so as to connect the said locking element to the said bar and thus prevent it from getting lost.

In addition, the invention also proposes a three point mounting assembly for mounting one part of a lighting or indicating unit for a motor vehicle on another part of the unit, and including at least two mounting devices in accordance with the invention, the transverse openings of the recesses of the said retaining parts being capable of occupying different angular positions in the retaining position.

In one form of the three point mounting assembly mentioned above, the third mounting point consists of a fixed mounting device which comprises firstly a bar mounted on one of the parts to be assembled together and including a spherical head, and secondly a retaining means which is mounted in a fixed manner on the other one of the said parts, and which includes a recess open transversely for receiving the head.

Thus, using the three point mounting assembly according to the invention, one part of a lighting or indicating unit for a vehicle can be rapidly fitted on another part of the unit, by a method which includes the following steps:

(a) the spherical heads are placed in a plane containing the three recesses,
(b) the said heads are introduced transversely into the said recesses through their transverse openings, and
(c) at least two of the retaining means are rotated in such a way that the transverse openings of the three recesses are then differently oriented.

The invention will be more clearly understood on a reading of the description which follows, of preferred embodiments of the invention, given by way of example only and with reference to the accompanying drawings.

DESCRIPTION OF PREFERRED EMBODIMENTS OF THE INVENTION

Figure 1:
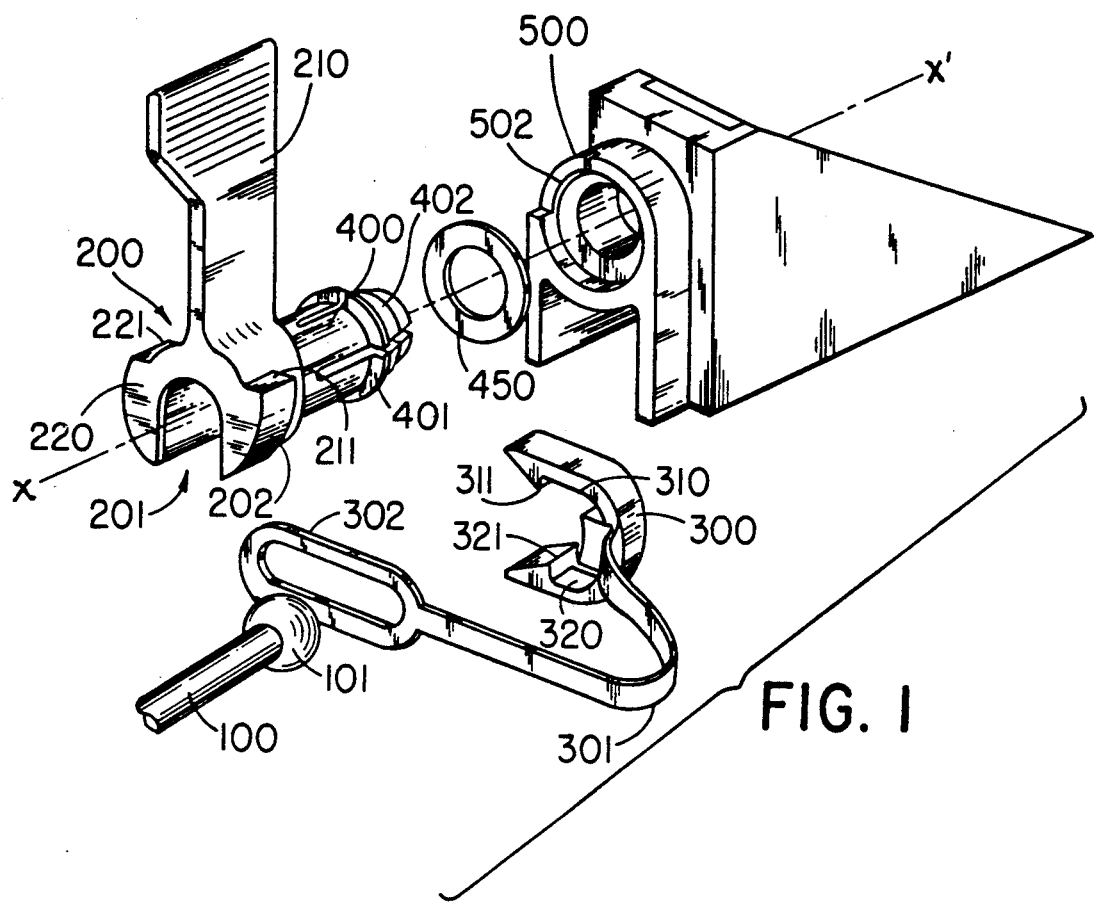
FIG. 1 is an exploded perspective view showing the mounting device in one form in accordance with the invention.

Referring first to FIG. 1, this shows one mounting device in accordance with the invention. This mounting device can be used, in particular, for mounting a headlamp reflector for a motor vehicle on a housing.

The mounting device shown in FIG. 1 comprises a bar 100 which includes an essentially spherical head 101. In a typical example, the bar 100 has an external thread (not shown), and is screwed on to the optical housing of the headlamp (which is also not shown), in such a way as to be adjustable for length. In addition, the mounting device further includes a retaining means 200 which includes a recess 201 which is essentially complementary to the head 101. The recess 201 is in the form of an essentially spherical cavity having a transverse open side for receiving the head 101, and a narrower front aperture through which the bar 100 itself, being narrower than the spherical head 101, can be inserted. In particular, the recess has the form of an inverted U, with its aperture being open downwardly in the position in which the head 101 is received.

Figure 2:
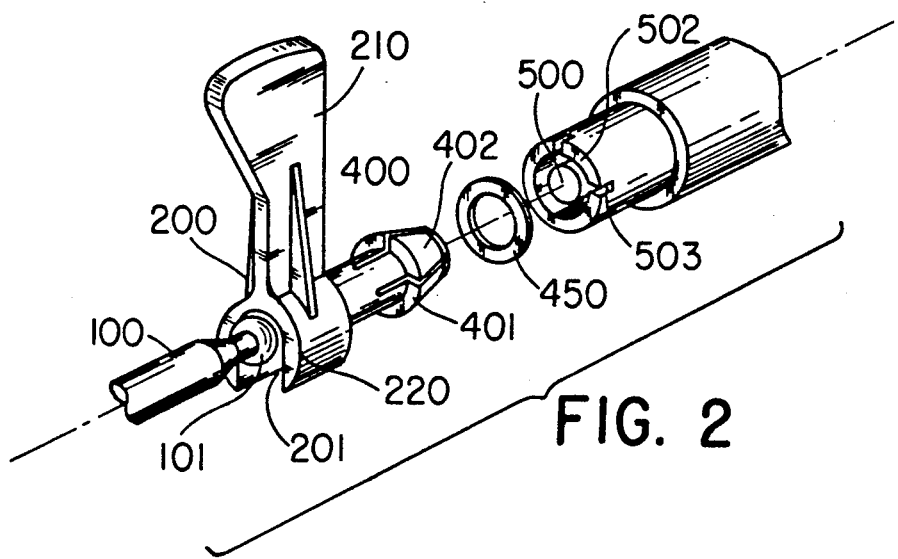
FIG. 2 is another exploded perspective view showing a modified form of the mounting device of FIG. 1, in which the retaining means is in position for fitting of the spherical head.
Figure 3:
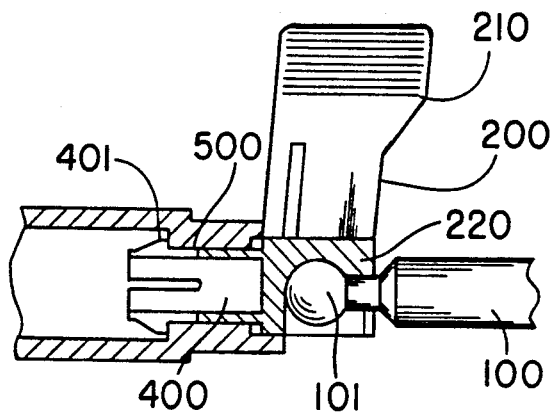
FIG. 3 is a side view of the device of FIG. 2.

In addition, the retaining means 200 is arranged to pivot about an axis X-X' which passes essentially through the center of the recess 201, between a position in which the head 101 can be fitted as is best seen in FIGS. 2 and 3, and a retaining position in which the head 101 is retained in the recess 201. More particularly, and as shown in FIG. 1, the retaining means 200 has the form of a key, which comprises a pivoting neck portion 210 and a retaining foot 220, in which the inverted U-shaped recess 201 is formed. The retaining means 220 is fixed to an assembly nose 400, having four branches and defining an axis which is essentially parallel to the bar 100.

Each of the branches of the assembly nose 400 includes a clipping tooth 401 close to its free end 402, whereby the assembly nose 400 can be clipped in position, in such a way that it is able to rotate, in a bearing 500, which is carried for example on the rear of the reflector. An annular gasket 450, of a flexible elastomeric material, is placed between the assembly nose 400 and the cylindrical wall of the bearing 500, so as to take up any play between the nose 400 and this cylindrical wall. In addition, the bearing 500 is formed with a slot 502 which extends over about a quarter of a circle, and which cooperates with the pivoting neck portion 200 when the assembly nose 400 is clipped into the bearing 500. The slot 502 limits the angular pivoting motion of the retaining means 200, for example to 90 degrees.

In the embodiment of the mounting device shown in FIG. 1, the latter includes a locking element 300 which is arranged to be clipped on to the retaining means 200 so as to close the transverse opening, i.e. the open side, of the recess 201 containing the head 101, when placed in the retaining position. This locking element 300 is essentially U-shaped, and has two latching teeth 311 and 321 on the inner faces of its two branches 310 and 320 respectively. The retaining means 200 is formed with two flats 211 and 221, and the teeth 311 and 321 cooperate with the flats 211 and 221 respectively. The flats are formed on the retaining foot 220 of the retaining means 200. In addition, the locking element 300 includes a connecting strap 301 which terminates in a retaining loop 302. The latter is slid on to the bar 100 so as to couple the locking element 300 to the bar 100, so that it will not become lost.

FIGS. 2 and 3 show a modified version of the arrangement shown in FIG. 1. In FIGS. 2 and 3, the retaining means 200, again in the form of a key, does not include any flats for clipping on the retaining foot 220. In addition, as is best seen in FIG. 2, the slot 502 of the bearing 500 includes at its corresponding end, in the locked position of the retaining means 200, a ramp shaped profile such that the pivoting neck portion 210 is able to engage in a locking notch 503, this engagement being maintained by the compressed elastic gasket 450.

Figure 4:
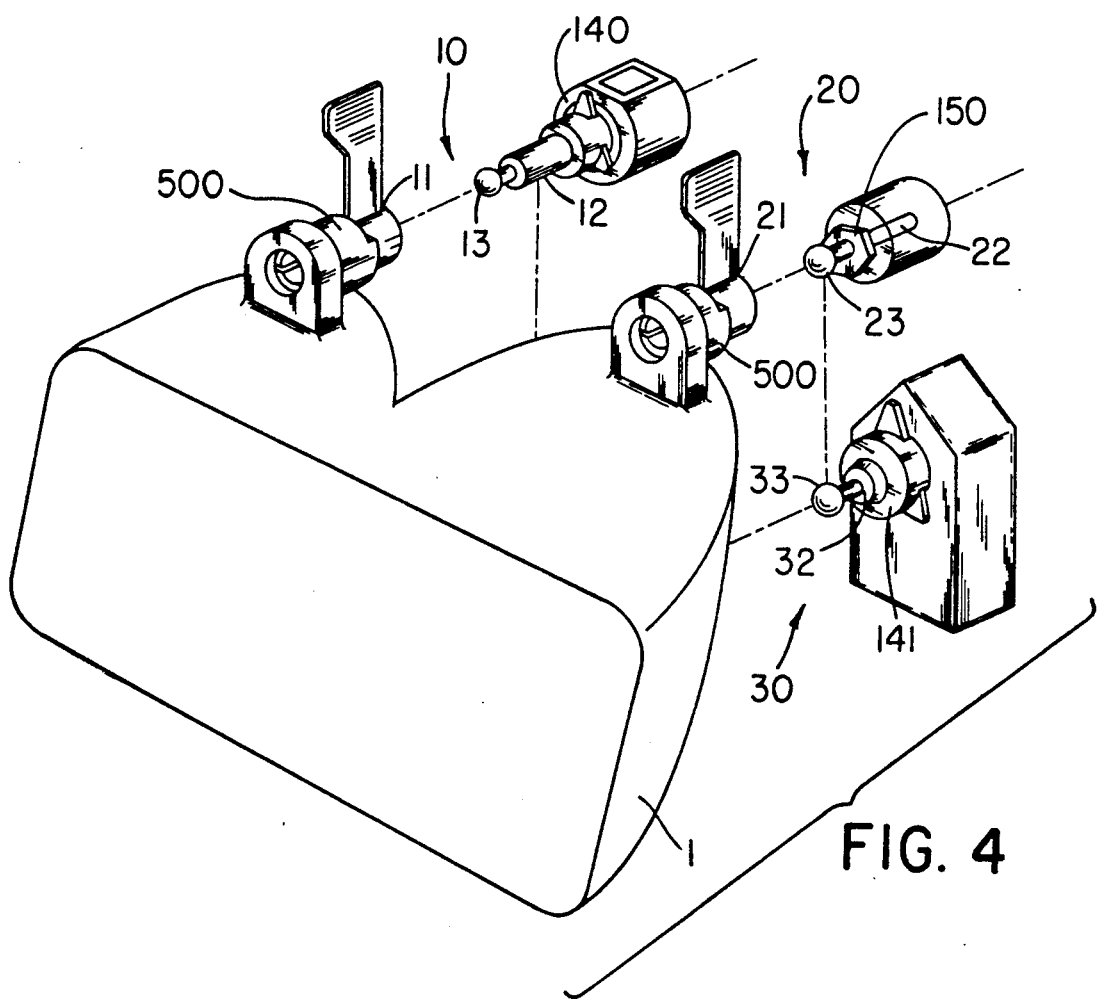
FIG. 4 is a perspective view showing a three point mounting device in accordance with the invention.

FIG. 4 shows a three point mounting for a reflector 1, on a headlamp housing or casing, which is not shown. This mounting assembly comprises two mounting devices 10 and 20, generally of the kind described above, with their retaining portions, 11, 21 respectively, being located at the same height as the rear part of the reflector 1, and being capable of pivoting in such a way that the respective transverse apertures of the corresponding recesses 11a and 21a respectively occupy predetermined angular positions, as can be seen in detail in FIG. 5. In addition, the mounting assembly of FIG. 4 includes a fixed mounting device 30. This device 30 comprises a fixed retaining portion 31 and a bar 32. The retaining portion 31 is mounted on the rear of the reflector 1, in such a way that the three retaining portions 11, 21 and 31 are located at the apices of a triangle, while the bar 32 is mounted on the housing and includes a spherical head 33. The fixed retaining portion 31 is formed with a fixed recess 31a in the form of a downwardly open inverted U. It should be pointed out that the bars 12 and 32, being screwed on to the housing, are adjustable in length by means of motorised adjusting devices 140 and 141, in such a way as to adjust the horizontal and vertical position of the reflector 1. By contrast, the bar 22 is fitted in a fixed position on the casing by means of a nut 150.

Figure 5:
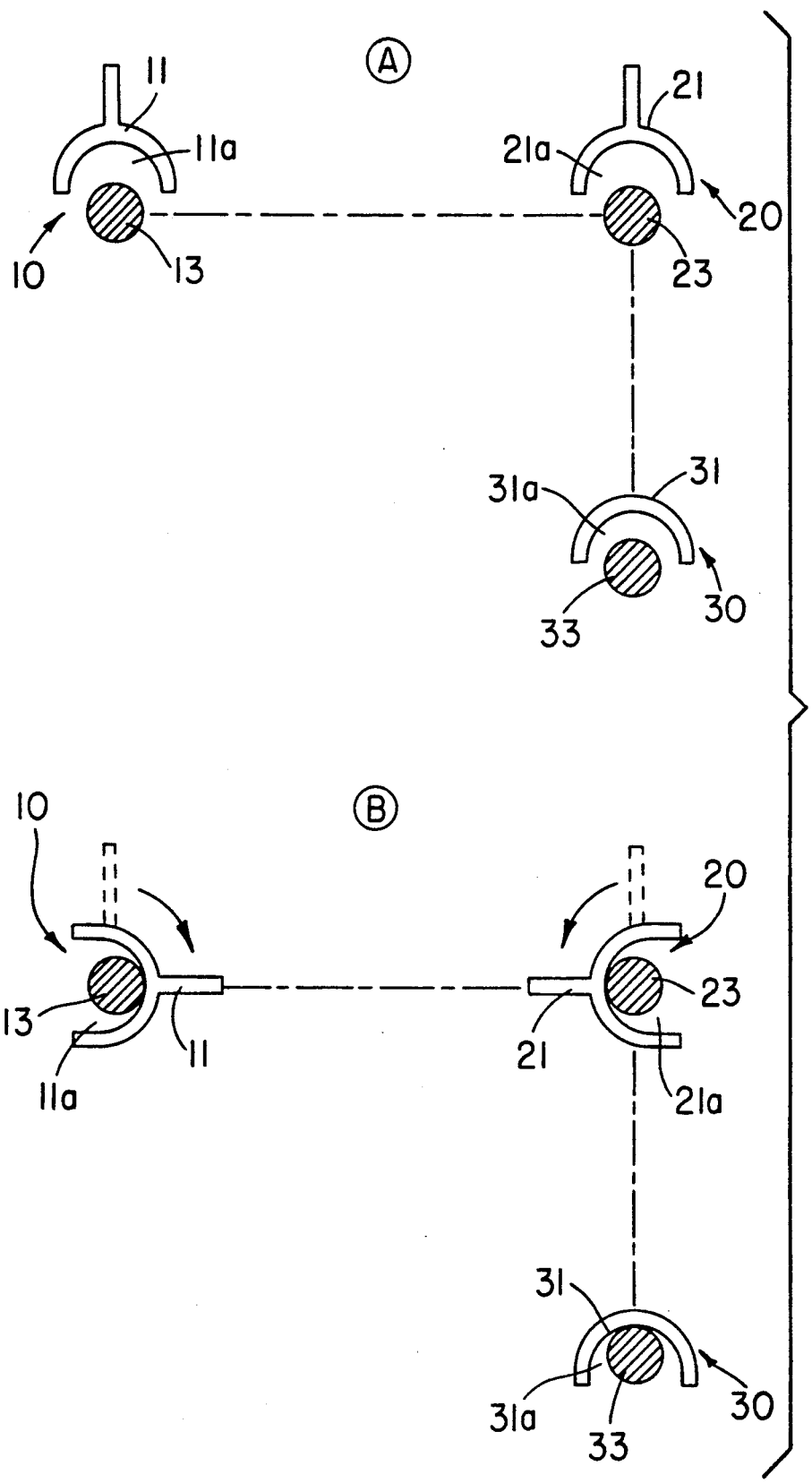
FIG. 5 is a diagram showing how the assembly of FIG. 4 is fitted.

Referring now to FIG. 5, this shows two steps in the method of fitting the reflector on the casing of the headlamp, using the mounting assembly shown in FIG. 4. These steps are indicated at A and B respectively in FIG. 5.

In step A, the three recesses 11a, 21a and 31a are placed in a position for receiving the spherical heads, with their openings facing downwardly; and the spherical heads 13, 23 and 33 are placed in a plane containing the three recesses 11a, 21a and 31a in such a way that all the heads can be introduced at the same time (from below in this example) into the recesses through their transverse open sides.

In step B, the two retaining means 11 and 21 containing the heads are rotated in opposite directions, so that the respective transverse open sides of the corresponding recesses 11a and 21a are opposed to each other. In this way the transverse open sides (openings) of the three recesses are oriented differently from each other. As a result, the bars 12, 22 and 32 are blocked against movement axially and transversely, thus securing the reflector on the headlamp housing. The orientation of the reflector can then be adjusted by adjusting the length of the bars 12 and 32.

The present invention is of course in no way limited to the embodiments described and shown above: a person skilled in this technical field will be able to apply any desired modification to it within the scope of the invention.

What is claimed is:

1. A unit for a motor vehicle for coupling a lighting unit to a vehicle, comprising a mounting device for securing the lighting unit to the vehicle, at least one bar, an essentially spherical head carried by said bar, and at least one retaining means for engaging said bar and said essentially spherical head in order to couple the lighting unit to the vehicle, retaining means have a recess substantially complementary to said head for receiving said head therein, said recess having a transverse opening for receiving said head and said bar, said recess defining a transverse axis passing substantially through said recess center, whereby said retaining means is pivotable about said axis between a first position in which said head can be fitted in said recess and a second position in which said head is retained in said recess to couple the lighting unit to the vehicle.

2. A unit according to claim 1, wherein the retaining means further comprises a key having a pivoting neck portion and a retaining foot joined to the pivoting neck portion, said recess being formed in the retaining foot.

3. A unit according to claim 1 in which the lighting unit and the vehicle have a three point mounting, comprising at least two said mounting devices for the unit, each of said mounting devices respective transverse openings for said recesses in the individual retaining means thereof having a retaining position in its said respective second position, each of said retaining positions occupying a different relative angular position with respect to each other.

4. A unit for a motor vehicle for coupling a lighting unit to a vehicle, comprising a mounting device for securing the lighting unit to the vehicle, at least one bar, an essentially spherical head carried by said bar, and at least one retaining means for engaging said bar and said essentially spherical head in order to couple the lighting unit to the vehicle, retaining means having a recess substantially complementary to said head for receiving said head therein, said recess having a transverse opening for receiving said head and said bar, said recess defining a transverse axis passing substantially through said recess center, whereby said retaining means is pivotable about said axis between a first position in which said head can be fitted in said recess and a second position in which said head is retained in said recess to couple the lighting unit to the vehicle wherein the mounting device further includes a locking element for clipping engagement on the retaining means to selectively close said transverse aperture of said recess containing said head.

5. A unit according to claim 4, further comprising a connecting strap having at least two ends, having at one of said ends a retaining loop for engaging said bar to connect said locking element to said bar.

6. A unit according to claim 4, wherein the locking element further comprises an essentially U-shaped pair of latching teeth said teeth defining two branches, each of said branches having an inner face, with each inner face defining a respective one of said latching teeth, said retaining means having a pair of flats, each of said flats cooperating with a respective one of said teeth.

7. A unit for a motor vehicle for coupling a lighting unit to a vehicle, comprising a mounting device for securing the lighting unit to the vehicle, at least one bar, an essentially spherical head carried by said bar, and at least one retaining means for engaging said bar and said essentially spherical head in order to couple the lighting unit to the vehicle, retaining means having a recess substantially complimentary to said head for receiving said head therein, said recess having a transverse opening for receiving said head and said bar, said recess defining a transverse axis passing substantially through said recess center, whereby said retaining means is pivotable about said axis between a first position in which said head can be fitted in said recess and a second position in which said head is retained in said recess to couple the lighting unit to the vehicle further including an assembly nose defining an axis essentially parallel to said bar, with the lighting unit and the vehicle having a bearing in which the assembly nose is clipped for rotation in said bearing.

8. A unit according to claim 7 in which said retaining means further comprises a pivoting neck portion, wherein said bearing has a slot formed therein, said slot cooperating with said pivoting neck portion in order to limit pivoting movement of said retaining means between said first and second positions.

9. A unit according to claim 8, whereby said slot has at least one of its ends a notch in which said retaining means is locked in said retaining position.

10. A unit for a motor vehicle for coupling a lighting unit to a vehicle, comprising a mounting device for securing the lighting unit to the vehicle, at least one bar, an essentially spherical head carried by said bar, and at least one retaining means for engaging said bar and said essentially spherical head in order to couple the lighting unit to the vehicle, retaining means having a recess substantially complementary to said head for receiving said head therein, said recess having a transverse opening for receiving said head and said bar, said recess defining a transverse axis passing substantially through said recess center, whereby said retaining means is pivotable about said axis between a first position in which said head can be fitted in said recess and a second position in which said head is retained in said recess t couple the lighting unit to the vehicle, said unit further having at least two said mounting devices for the unit, each of said mounting devices respective transverse openings for said recesses in the individual retaining means thereof having a retaining position in its respective second position, each of said retaining positions occupying a different relative angular position with respect to each other, the three points of the three point mounting including a third point defined by a fixed mounting device, the fixed mounting device having a third bar mounted on the lighting unit and the vehicle, a spherical head carried by said third bar, and a fixed retaining means having a recess with a transverse opening for receiving said third bar head.

11. A method of fitting a motor vehicle lighting unit to a motor vehicle comprising the steps of:
(a) putting each of three spherical heads formed on respective bars that protrude from the vehicle into a plane containing recesses formed in each of three respective mounting devices on the lighting unit;
(b) introducing said heads transversely into the said recesses through respective transverse openings formed in said mounting device; and
(c) rotating at least a portion of two of said mounting means whereby to put said transverse openings of said three recesses into different respective orientations.

* * * * *

UNITED STATES PATENT AND TRADEMARK OFFICE
CERTIFICATE OF CORRECTION

PATENT NO.   :   5,313,374
DATED        :   May 17, 1994
INVENTOR(S)  :   Ghislaine Pinson It is certified that error appears in the above-identified patent and that said Letters Patent is hereby corrected as shown below:

Column 5, Claim 1, line 10, delete "have" and substitute -- having --;

Column 6, Claim 10, line 39, delete "t" and subsitute -- to --.

Signed and Sealed this

First Day of November, 1994

Attest:

Attesting Officer

BRUCE LEHMAN

Commissioner of Patents and Trademarks